No. 888,282. PATENTED MAY 19, 1908.
H. O. WESTENDARP.
EXPLOSIVE ENGINE.
APPLICATION FILED NOV. 4, 1903.

Witnesses:
Helen Alford
C. Bradway

Inventor
Henry O. Westendarp
By Albert H. Davis
Att'y.

No. 888,282. PATENTED MAY 19, 1908.
H. O. WESTENDARP.
EXPLOSIVE ENGINE.
APPLICATION FILED NOV. 4, 1903.

Witnesses:
Helen Alford
C. Bradway

Inventor
Henry O. Westendarp,
By Albert H. Davis
Att'y.

No. 888,282. PATENTED MAY 19, 1908.
H. O. WESTENDARP.
EXPLOSIVE ENGINE.
APPLICATION FILED NOV. 4, 1903.

Witnesses:
Helen Alford
C. Bradway

Inventor,
Henry O. Westendarp,
By Albert G. Davis
Att'y.

No. 888,282. PATENTED MAY 19, 1908.
H. O. WESTENDARP.
EXPLOSIVE ENGINE.
APPLICATION FILED NOV. 4, 1903.

Witnesses:
Helen Alford
C. Bradway

Inventor,
Henry O. Westendarp,
By Albert S. Davis
Att'y.

No. 888,282. PATENTED MAY 19, 1908.
H. O. WESTENDARP.
EXPLOSIVE ENGINE.
APPLICATION FILED NOV. 4, 1903.

Witnesses:
Helen Alford
C. Bradway

Inventor,
Henry O. Westendarp,
By Albert H. Davis
Att'y.

UNITED STATES PATENT OFFICE.

HENRY O. WESTENDARP, OF SAUGUS, MASSACHUSETTS, ASSIGNOR TO GENERAL ELECTRIC COMPANY, A CORPORATION OF NEW YORK.

EXPLOSIVE-ENGINE.

No. 888,282.     Specification of Letters Patent.     Patented May 19, 1908.

Application filed November 4, 1903. Serial No. 179,771.

*To all whom it may concern:*

Be it known that I, HENRY O. WESTENDARP, a citizen of the United States, residing at Saugus, county of Essex, and State of Massachusetts, have invented certain new and useful Improvements in Explosive-Engines, of which the following is a specification.

This invention relates to a two-cycle explosive engine, preferably of the multiple cylinder type, and one designed for the use of kerosene vapor-mixture as the combustible. More particularly the invention relates to that class of engines which operate on the two-cycle principle but, wherein the cycle is somewhat modified in respect to the explosion chamber being scavenged of its contents of spent gases by a charge of air, instead of a charge of mixture as in the usual two-cycle engine, and the fuel being injected into the explosion chamber immediately after the scavenging operation, when the exhaust ports are closed, whereupon it mixes with the air contained in the chamber and produces the proper explosive mixture.

Thermodynamically, the advantages of this modified cycle over the simple two-cycle principle reside in the fact that the mixture obtained in the explosion chamber, instead of being polluted by residual vitiating burned gases and being consequently of low calorific value, possesses a higher explosive and combustible quality by virtue of which a more powerful impulse is capable of being imparted to the piston and higher speed of the engine developed. Also on the score of economy there is a saving in mixture, inasmuch as the fuel is admitted to the explosion chamber only after the exhaust ports are covered, so that it is impossible for fuel to escape through the same, as is the case in the simple form of engine where the scavenging takes place by the incoming charge of mixture while the exhaust ports are open.

Various engines have been proposed to carry out the two-cycle principle of operation on these modified lines, but they are of more or less complicated construction, involving a multiplicity of parts and are otherwise mechanically objectionable. Characteristic among the features of these engines is that of employing two oppositely-acting pistons in a single cylinder, between which the explosions of the combustible take place, and the energy of explosion is imparted equally to the pistons. In this arrangement one piston controls the exhaust ports, and the admission ports are controlled by the other piston.

Another objectionable point in connection with these engines is the means and method of effecting the scavenging of the explosive chamber. Air is pumped into an auxiliary reservoir and compressed therein by any suitable means driven from the engine crankshaft, and at the time the air admission ports uncover, the charge of compressed air transfers into the explosive chamber by its own expansion force and expels the burned gases. In order, however, to place the air under compression, it is necessary that work be done, and as the power is derived from the crank-shaft to do this work, the effect thereof is to correspondingly reduce the output of the engine.

In the present invention, the construction of the engine and the method of operation are such as to avoid the objections above mentioned. The mechanical arrangement and design is much simplified in respect to using only a single power piston with its simple and less complicated crank connection, and a closed headed cylinder with the three sets of ports: viz., the exhaust ports, the air-admission ports and the fuel-admission ports at the forward or open end of the cylinder which are covered and uncovered by the piston during its movement.

The use of compressed air in the scavenging operation is dispensed with, so that the power which would otherwise be consumed in establishing the air pressure contributes to the total output of the engine. According to the present method the air-charges are transferred to the explosion chamber by mechanical displacement; that is to say, an air-pump driven by the engine crank shaft delivers its charge directly to the explosion chamber after each explosion, when the power piston uncovers the exhaust and air-admission ports. The relation existing between the piston of the air-pump and the power piston is such that the discharge stroke of the air pump occurs at a time when the power piston is moving through the dead center, this corresponding to a period when the air-admission ports are uncovered a relatively long time, due to the slow rectilinear movement of the piston. By this arrangement the pump works against very slight back pressure except that due to the resistance offered by the passage between the air-chamber of the pump and the explosion chamber as the air passes therethrough.

An important feature in the air system connected with the scavenging operation consists of having the air pump so proportioned that its capacity or displacement will exceed that amount of air which is capable of passing into the explosion chamber in the interval between the uncovering and covering of the air-admission ports. In other words, the power piston is so related to the air-admission ports as to close them before the air pump finishes its delivery stroke The effective supply of air is thus interrupted or cut-off, and by means of a by-pass the residuum of the air contained in the air chamber of the pump is diverted through the fuel-admission ports of the explosion chamber with which the by-pass connects. Into each of these by-passed portions of the air charges, a regulated charge of kerosene or other liquid fuel vapor is injected and these entrain with each other to combine their pressures and issue into the explosion chamber with considerable force so as to completely agitate with the charge of air which has been previously supplied to the chamber during the main part of the discharge stroke of the pump.

According to this system of operating a two-cycle explosive engine, an absolutely clean explosive chamber containing pure air is obtained after each explosion, and consequently the vapor fuel in the presence of the air provides a highly explosive and inflammable combustible, and furthermore, as the engine is of simple construction with few working parts, and therefore possessing a minimum of internal friction, the conversion of thermal energy into mechanical work is much larger than in the usual two-cycle engine.

The various novel features of construction and combination of parts will be more fully described hereinafter and finally pointed out in the claims.

In the accompanying drawings which illustrate one embodiment of my invention.

In its simplest form, an engine to embody my invention comprises a single explosion cylinder closed at one end and provided with three sets of ports; the exhaust ports, air-admission and fuel-admission ports, and an air pump which is arranged in definite operative relation to the power piston as to deliver sufficient of its charge to scavenge the explosion cylinder previous to closure of the air-admission ports by the power piston, and whereupon the remainder of the air charge is delivered through a by-pass leading to the fuel-admission ports for the purpose of injecting through the same and into the cylinder a charge of vapor fuel which is admitted into the by-pass at the same time the air passes therethrough.

In the arrangement that fulfills these conditions the pump is preferably driven from the crank shaft and the necessary lag between the strokes of the power piston and pump piston is obtained either by angularly displacing the cylinders, or by displacing the cranks with which the pistons connect, to the required angle to give the proper sequence to the cycle.

In the preferred construction, the engine is of the four-cylinder type, with the cylinders disposed in pairs, side by side, the cylinders of each pair being angularly displaced at 90 degrees in a common plane, or opposite each other, so as to enable opposite pistons to connect on the same crank pin to permit of a two-throw crank shaft being employed. The turning moment of the crank shaft is therefore equivalent to that of a single throw crank receiving a power impulse each quarter of a revolution.

Referring to the drawings, 1 represents the cylinders of the engine and 2 the pistons. These are both of the differential type and they coöperate to form explosive chambers A, B, C and D, and air chambers $a$, $b$, $c$ and $d$. The differential cylinders are each composed of two castings bolted together, one being an explosive cylinder and the other a pump cylinder of relatively larger diameter. The explosion cylinder is designed for single acting work, and is accordingly provided with a closed head or compression chamber 3 and the exhaust and admission ports are arranged at the forward or open end to be controlled by the piston by which they are covered and uncovered. The pump cylinders are cast integral and constitute the base of the engine. The engine, as a whole, is supported by means of laterally-extending brackets or arms 4 on the pump cylinder casting, which rest upon parallel I-beams 5. Centrally below the pump cylinders and bolted thereto is a crank casing 6, in which is suitably mounted a two-throw crank shaft 7.

The differential pistons 2 are of the trunk type, having each an explosion or power head 8 and an annular pump head 9. The pistons are directly connected with the crank shaft by connecting rods 10. In order to permit of the rods of each pair of opposite pistons to aline, one rod of each pair is provided with a bifurcated shaft end and the other rod is mounted within the same according to common construction.

Figure 7:
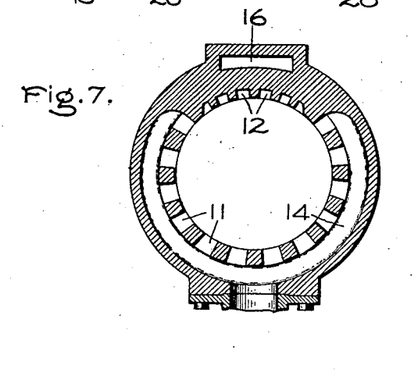
Fig. 7 is a transverse section of one of the explosion cylinders showing the exhaust ports and chamber and air-admission ports.

Each explosion cylinder is provided with exhaust ports 11, air-admission ports 12 and fuel-admission ports 13. The exhaust ports are suitably proportioned and extend partially around the cylinder, Figs. 4 and 7, at a point coinciding with the end of the power stroke or forward dead center, and they communicate with an exhaust chamber 14. The air-admission ports extend circumferentially between the ends of the set of exhaust ports, and these ports are arranged to uncover slightly after the exhaust ports begin to uncover, so as to permit the pressure of the explosive gases in the cylinder to lower to atmospheric pressure. This enables the scavenging charge of air to be injected into the explosion chamber against a minimum pressure offered by the contents of the chamber. The fuel-admission ports are suitably remote from the exhaust ports toward the compression end of the explosion cylinder. The admission of fuel through these ports is controlled by suitable valve mechanisms hereinafter to be described, which serve to prevent the expanding gases of explosion from escaping therethrough after these ports are uncovered by the piston on its power stroke. Separate passages 15 and 16 are provided in the wall of each explosive cylinder, which communicate respectively with the air-admission ports 12 and fuel-admission ports 13. These passages incline at an angle to the axis of the cylinder for the purpose of directing the injected air charge and fuel charge against the head of the cylinder to thoroughly scavenge the explosion chamber in the first instance and to completely mix the vapor fuel with the air in the chamber in the latter instance. In order to facilitate the scavenging operation and the agitation of the fuel and air to produce the explosive mixture, a deflector 17 is provided on the power head 8 of the piston which positively deflects the charges in the direction of the cylinder head.

Figure 4:
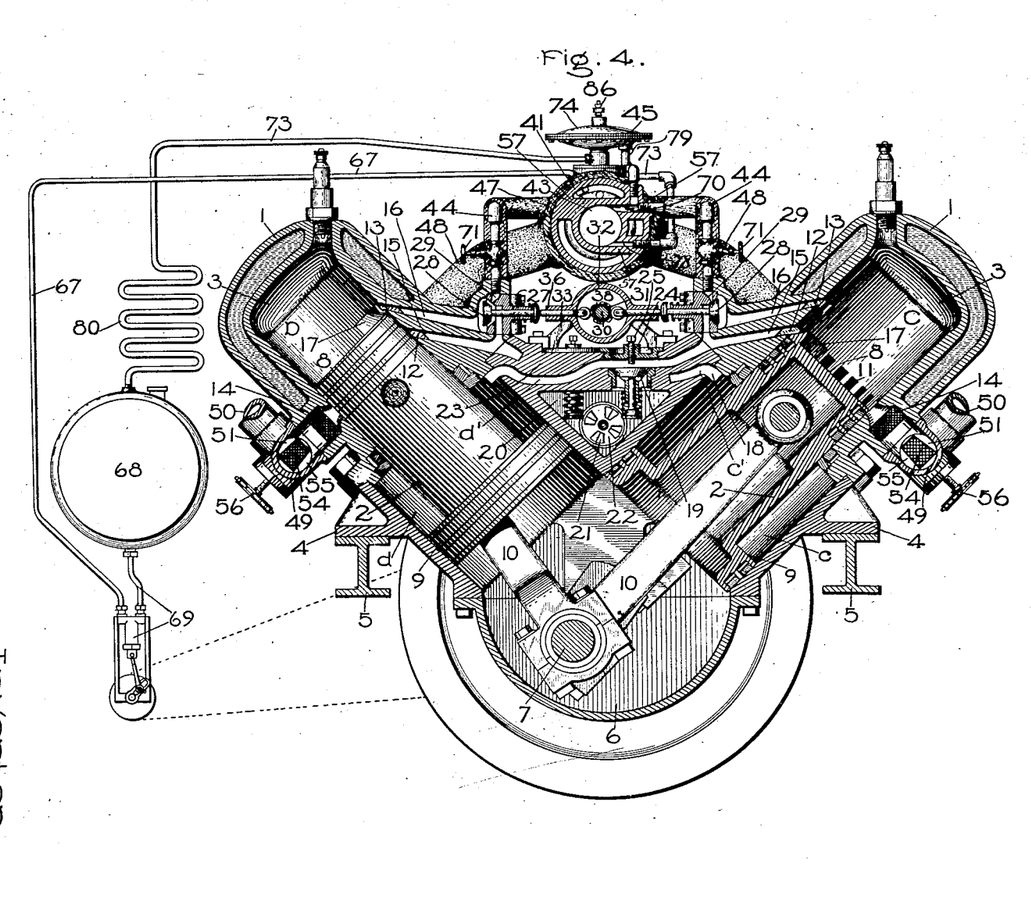
Fig. 4 is a section taken on one plane centrally through one pair of cylinders and on a different plane through the vaporizer to plainly show the pipe connections therewith.
Figure 8:
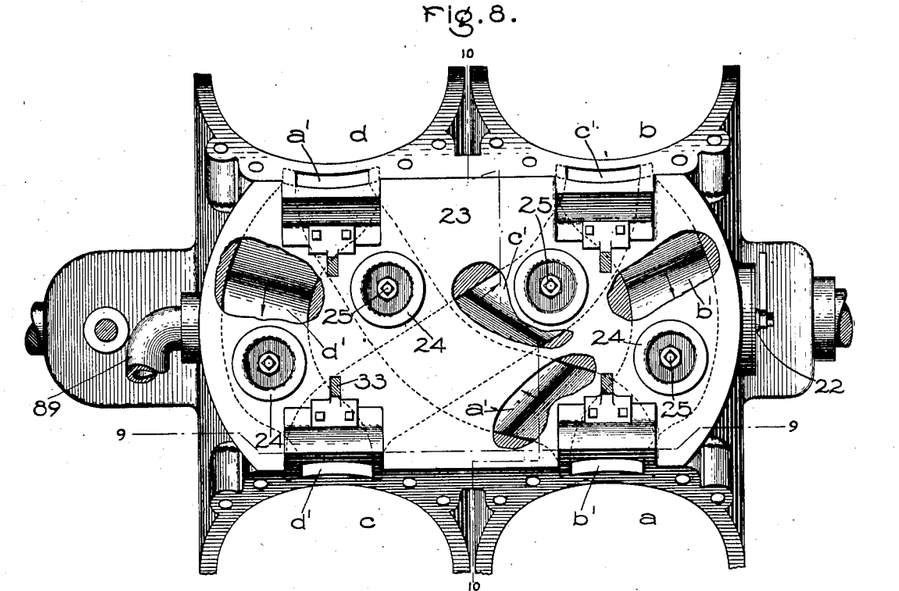
Fig. 8 is a plan view of the suction chamber situated centrally between the cylinders and indicating the air-carrying conduits by means of which each air-pump cylinder is connected with its complementary explosion cylinder.
Figure 9:
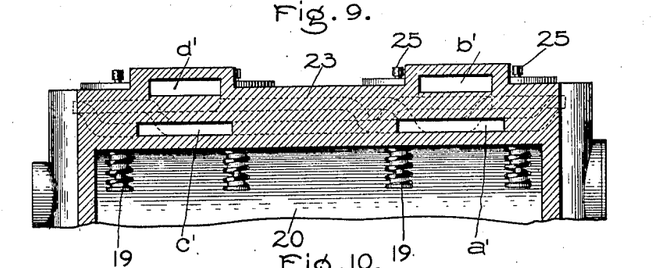
Figs. 9 and 10 are detail sections of portions of the air suction chamber showing the air-carrying conduits, taken respectively on lines 9 9 and 10 10, Fig. 8.
Figure 10:
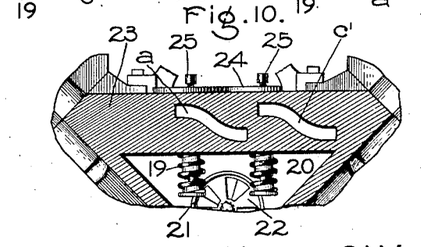

Each passage 15 forms a continuation of independent air-carrying conduits $a^1$, $b^1$, $c^1$ and $d^1$, Figs. 4 and 8. These conduits connect the air-chambers $a$, $b$, $c$ and $d$, respectively with the explosion chambers B, C, D and A. The air chambers have each a single port 18, Fig. 4, through which the air charge is drawn into the chamber and through which it is also discharged. In each conduit a suction valve 19 is provided, which is automatic in action so as to open under the influence of the suction stroke of the pump piston to permit the intake of air and to close upon reversal of stroke to permit the delivery of air through the conduit and air-admission ports to the explosion chamber.

The inlet side of the suction valve is in communication with a suction chamber 20. This chamber is formed in the pump cylinder casting centrally between the cylinders. The suction of atmospheric air into the chamber 20 takes place through an opening 21 at one end thereof, and by means of a rotary disk valve 22 the quantity of air drawn into the chamber may be regulated. This is an important function in connection with governing the speed of the engine, for the reason that according to the degree that the intake of air into the suction chamber is limited or varied relatively to the maximum, the scavenging charges of air correspondingly vary so that the scavenging of the explosion chamber of the burned gases will be more or less complete, leaving a residue of the gases with which the fuel charges mix. The explosive mixture thus obtained will be below the normal explosive and caloric value and consequently the power impulses will be comparatively weaker. In this manner the power impulses may be controlled within certain limits so as to adapt the engine to different speed work. The valve 22 may be regulated automatically by a suitable governing mechanism, but in the present instance a manually-actuated valve is employed.

Figure 5:
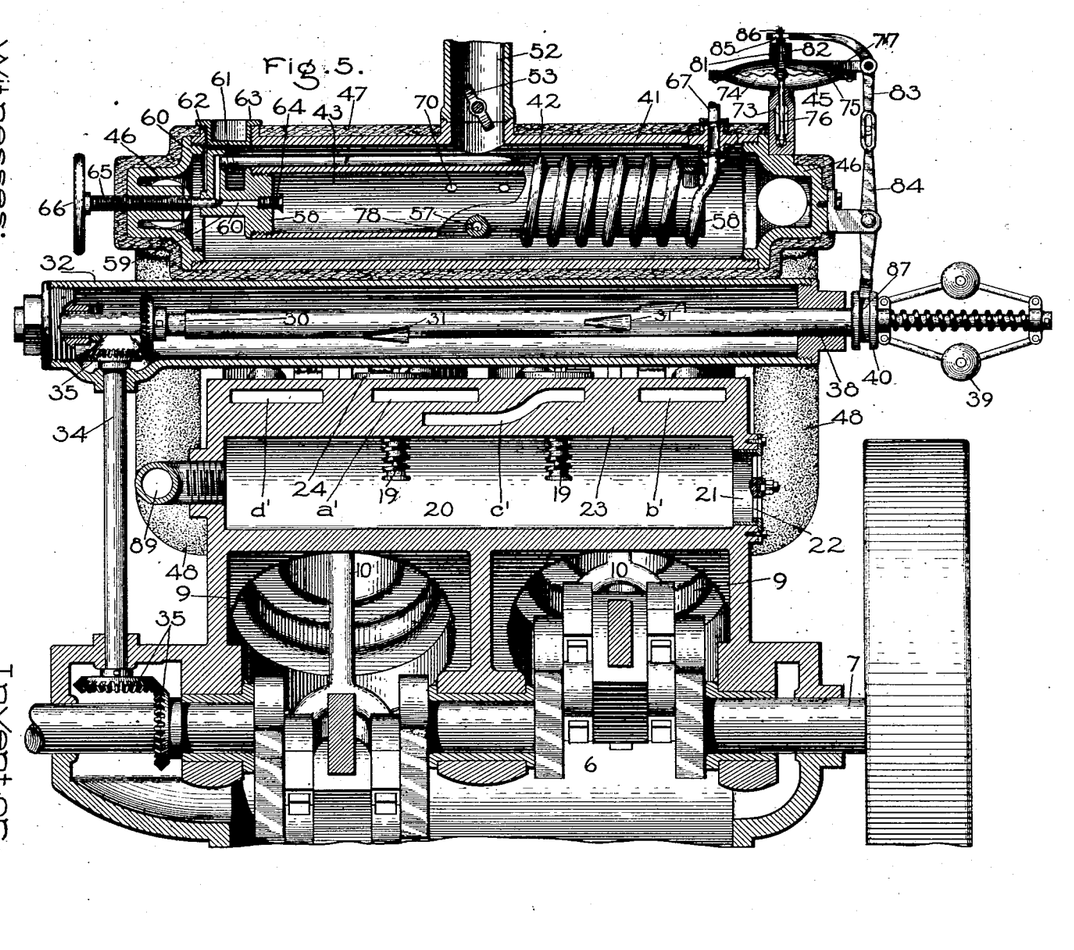
Fig. 5 is a central vertical section of the engine on an enlarged scale and taken longitudinally through the vaporizer, the valve governing device and the crank chamber.

The air-carrying conduits are preferably cored out in the web 23 between the pump cylinders which comprises the top of the suction chambers, Figs. 4, 5 and 8. These conduits are designed so as to provide within a limited area the particular system of connections between the various air chambers and explosin chambers. The suction valves 19 are of the puppet-cage type and are each removably secured in that portion of the web 23 between the suction chamber 20 and each air-carrying conduit. To permit of access to the valves, hand holes are provided in the web directly over the valves and these are closed by covers 24. Each cover is provided with an adjustable stop 25 which limits the extent to which the valve is capable of opening, and thereby relieves excessive tension upon the valve spring.

As shown in Fig. 4 the passages 16 which lead to the fuel-admission ports are by-passes communicating with the air-carrying conduits. A mechanically-operated valve is provided in each by-pass to control communication therethrough. This consists of a valve casing 27 and a by-pass puppet valve 28 having a stem guided in the casing, and is spring-actuated as usual. Each explosion cylinder is recessed at the outer end of its passage 16 to receive the casing which is removably bolted in place. The function of these by-passes or passages 16 is to provide means for utilizing a portion of each air-charge for contributing to inject the fuel charge into the explosion chamber. To accomplish this the fuel charge must be admitted into the passage during the time the by-passed portion of the air-charge is pumped through the passage. The fuel may be admitted in the form of vapor, or a liquid depending upon the degree of volatability thereof to vaporize while entraining with the air in passing to the explosion chamber. As to the manner of admitting the fuel charge, a fuel-inlet valve may be provided to open into each by-pass whereby the fuel can be admitted thereto simultaneously, or substantially so, with the opening of the by-pass valve 28, so that the fuel and by-passed air may issue together into the explosion chamber. In the preferred arrangement, however, the by-pass valve 28 possesses the additional function of admitting the fuel charge. For this purpose the valve seat is provided with a fuel port 29, Fig. 4, which connects with a suitable fuel supply system as will be hereinafter described. Thus, as the by-pass valve opens to permit air to pass, it also uncovers the fuel-admission port to permit the fuel charge to inject into the by-pass at the same time.

These by-pass valves are actuated from a secondary shaft 30 by means of cams 31. The secondary shaft is suitably mounted in a cam casing 32 which is mounted on the air-suction chamber 20 in superimposed position and supported on brackets 33, Figs. 3 and 4. The secondary shaft is driven from the crank shaft through an intermediate shaft 34 and intermeshing bevel gears 35 at the ends thereof and on the crank shaft and secondary shaft, Fig. 5.

Figure 6:
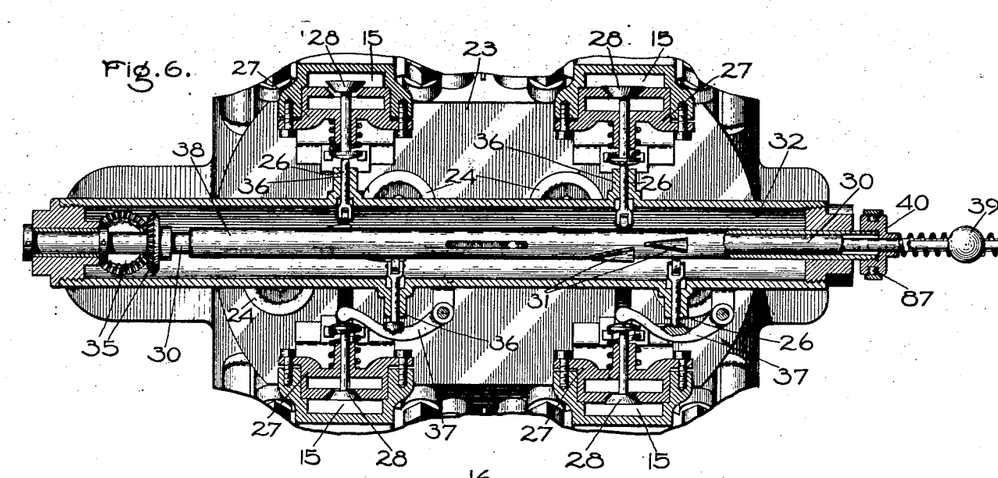
Fig. 6 is a detail view of the inlet valves with the secondary shaft and cut-off mechanism parts shown in section and plan.

The by-pass valves of each pair of cylinders are disposed opposite each other in symmetrical arrangement relatively to the secondary or cam shaft, Fig. 6. The cams 31 are disposed around the secondary shaft at 90 degrees. Intermediate the cams and stems of the by-pass valves are valve tappets 26 which extend through the walls of the cam casing and are mounted in bosses 36. One of the cams for each pair of valves alines with the respective valve stem, whereas the other cam is off-set relatively to its valve-stem and the tappet therefor is correspondingly off-set. Each off-set tappet is operatively related to its valve stem by means of a lever 37. This latter member is hinged on the cam casing and is supported in operative connection with its tappet and valve stem.

In connection with the present valve mechanism, variable cut-off regulation of the fuel supply to the explosion chamber is particularly desirable for maintaining the speed of the engine constant under varying load conditions. Such regulation may be either automatic, as by a speed governor, or manual, as by an operating lever, similar to launch or automobile work. To this end the cams are formed with their working portions diminishing in one direction and are carried on a sleeve 38 slidably keyed on the secondary shaft in the cam chamber. The front end of the cam sleeve extends through the casing in suitable bearings and connects with a fly-ball governor 39 secured on an extension of the secondary shaft. The sleeve revolves with the shaft and governor by means of its rigid connection with the sliding collar 40 of the governor. Upon variation in speed of the engine, the governor responds thereto and varies the position of the cams relatively to the tappets so that the period of lift of the by-pass or fuel-admission valves may be regulated according to the quantity of fuel needed to produce explosive charges that have the necessary energy to maintain steady speed.

Considering the cycle of operation of the engine as thus far described, reference is had to Fig. 4 of the drawing, in connection with the following explanation: According to the stage, in the cycle as shown by the position of the pistons, the explosion chamber D has just been scavenged of the burned gases and contains a charge of pure air, with the exhaust and air-admission ports covered by the piston which is on its return or compression stroke, and the fuel-admission or by-pass valve is held in open position by the cam-actuating means, as the fuel charge is injected into the chamber by the by-passed charge of air from the air chamber $a$ which is discharging through the air-carrying conduit $a^1$, Figs. 4 and 8. In the explosion chamber C, the piston is approximately at dead center with the exhaust ports uncovered, and a scavenging charge of air being delivered into the chamber through the air-carrying conduit $d^1$ and uncovered air-admission ports for expelling the spent gases of explosion, the by-pass valve is as yet closed to prevent the fuel charge from injecting prematurely or before closure of the exhaust ports; the air chamber $c$ has filled with air on the forward or suction stroke of the piston and is about to deliver its contents to the explosion chamber B through the air-carrying conduit $c^1$ as the piston returns on its inward or compression stroke. As the piston in the explosion chamber B is 180 degrees displaced relatively to the piston of chamber D, the former is in a corresponding position to the latter but explosion has taken place and it is working on its power stroke; in this case the chamber $b$ is taking in a charge of air through the air-carrying conduit $b^1$ and its suction valve 19 from the suction chamber 20. Also, the piston in the explosion chamber A is approximately at its inner dead center, where compression of the explosive mixture in the chamber has ceased and ignition is about to occur, and the air chamber $a$ is in the final stage of delivering air through the by-pass leading to the air chamber D. The sequence of the engine as to the occurrence of explosions, taking the pistons in the position shown, is in the following order: explosion of the mixture has just occurred in B, which is followed consecutively by A, D, C, B, A, etc.; and as to the air charges, the air chamber $a$ delivers to the explosion chamber D, $d$ to C, $c$ to B, $q$ to A, $a$ to D, etc.

The air pumps are so proportioned that by their displacement each is capable of furnishing air in sufficient quantity to scavenge its respective explosion cylinder, and also to provide an excess of air for by-passing into the explosion chamber with the fuel charge. As the fuel admission ports of the explosion chambers are covered by the power pistons, it is necessary to have the pump pistons so related to the power pistons that the delivery of the by-passing portions of the air charges occurs slightly before or substantially at the time the power pistons begin to cover said ports. It will be noted that to carry out this scheme, each air chamber is connected with a definite explosion chamber of which the pistons hold such relation to each other that as the pump piston is delivering its charge the power piston is at or about passing through the forward dead center, or when the exhaust ports or fuel-admission and air-admission ports are uncovered.

A characteristic feature to be noted in connection with the engine operating on the present cycle is that of admitting the vapor fuel into the explosion chamber against a certain pressure which is due to the state of compression of the contents of the chamber incident to the initial part of the compression stroke of the piston. This is not the case in ordinary two-cycle practice wherein the fuel is admitted at substantially atmospheric pressure.

In order to overcome this internal pressure of the explosion chamber the full charge must be admitted at a relatively higher pressure, and also for the further reason that the fuel-admission ports are uncovered for an appreciably less time than when they are arranged at or adjacent to the forward dead center, where the movement of the piston is relatively slower, the fuel charge must be injected at a higher speed in order that sufficient fuel can enter before the ports are covered, to produce the proper explosion mixture in the chamber. Therefore, the vaporizer best adapted to meet this condition is one that can furnish vapor at a comparatively high and substantially constant pressure. The vaporizer shown herewith is of this kind and consists of a flasher type of vapor generator capable of producing vapor in superheated state and at any desired pressure. It is especially designed for the vaporization of such of the heavy liquid fuels as kerosene. The supply of fuel to the vaporizer is maintained at a substantially constant rate in definite quantity relatively to the vapor generating capacity of the vaporizer for producing sufficient vapor to meet the maximum demand of the engine. The waste gases of explosion are utilized for heating the vaporizer and a heating system in this connection is provided in which complete control of the temperature is rendered possible. As the demand for fuel varies from time to time according to load conditions the generating capacity of the vaporizer remains unaffected but means are provided to relieve vapor from the vaporizer as the vapor tends to rise above normal and thereby the vapor is maintained in normal condition. The relieved vapor is preferably by-passed back to its source and in transit it passes through a condensing device to change it to liquid state before delivering into the fuel tank.

Referring particularly to Figs. 4 and 5, the vaporizer comprises, in general terms, a heater 41, a vaporizing or flashing coil 42, a superheating chamber 43, vapor-fuel supply pipes 44 between the latter and by-pass valves 28, and a vapor-pressure-controlled by-pass or relief device 45 hereinafter to be explained.

Figures 2, 11, 12:
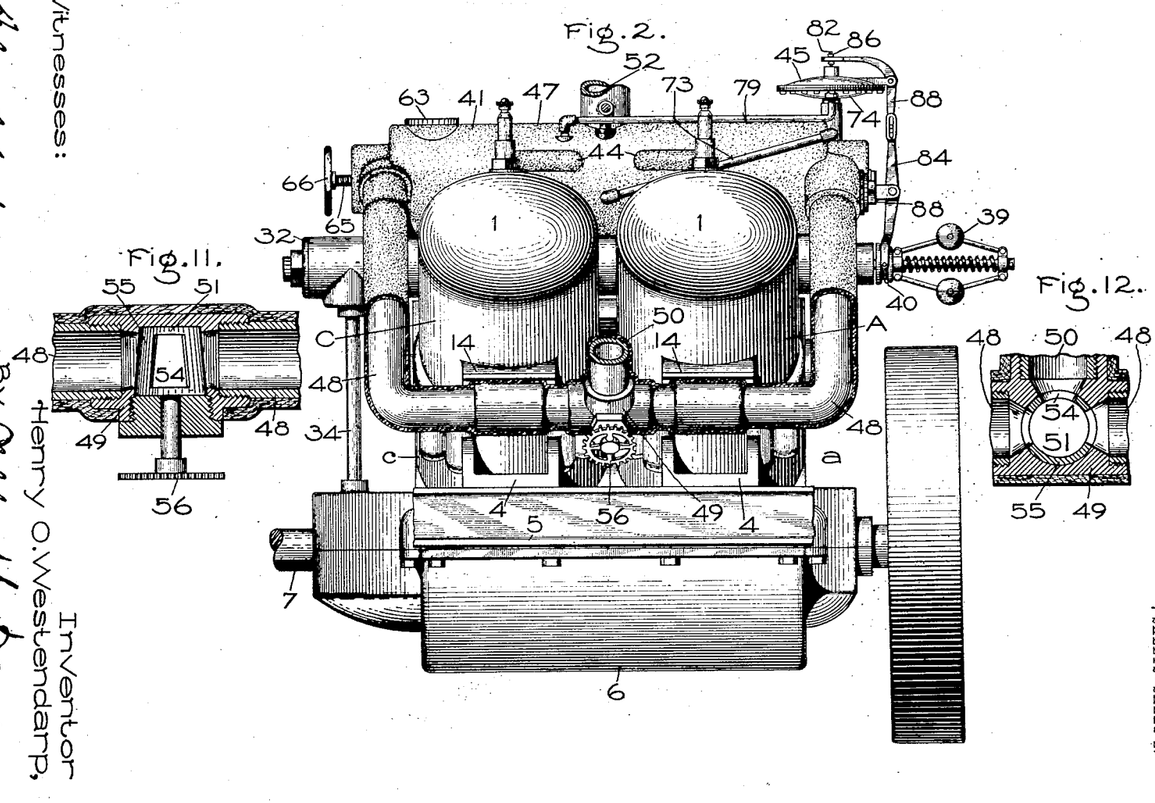
Fig. 2 is a side elevation.
Figs. 11 and 12 are enlarged detail views of a three-way valve in the exhaust pipes for regulating the supply of exhaust gases to the heating chamber of the vaporizer.

The heater 42 is superimposed centrally between the cylinders of the engine. This is a hollow cylindrical body having removable heads 46 at its ends and is inclosed in a heat non-conducting jacket 47, as of asbestos. The ends of the heater are connected with the exhaust chambers of the cylinders by exhaust pipes 48. These pipes are also covered with asbestos and their upper ends open into the heads of the heater. The exhaust chambers of each pair of cylinders on opposite sides of the heater are in open communication with each other through a T-connection 49, and from each of these connections a relief exhaust pipe 50 leads into the atmosphere, Figs. 2 and 3, and each T-connection 49 contains a three-way valve 51, Figs. 4, 11, and 12, by manipulation of which the exhaust gases may be caused to pass either through the exhaust pipes 48 to the heater at both ends thereof or at one end only, with a portion of the gases passing through the exhaust pipes 50, or the entire gases may pass through the latter pipes and the heater be cut out of service, as for instance when the heat becomes excessively high therein. But in order to exhaust the entire gases directly to the atmosphere through the pipes 50 and thereby cut the heater out of service, the heater is provided with an outlet or discharge pipe 52 in which is provided a damper 53 by means of which latter the discharge of gases into and through the heater and the exhaust pipe 52 connected therewith, Fig. 5, is prevented. As shown in Figs. 11 and 12, the ports 54 in the plug 55 of the three-way valve are placed in the position whereby the exhaust gases can escape through the exhaust pipes 50. These valves may be hand-operated or mechanically operated, and for the latter purpose the stem of the valve is provided with a sprocket 56, which is intended to be geared to any suitable mechanism for actuating the valve (the latter not being shown).

Within the heater the superheating chamber 43 is arranged, extending longitudinally and concentrically thereof, and is cast integral with the heater by means of connecting webs 57 located about centrally of the heater, Figs. 4 and 5. The vaporizing or flashing coil 42 hereinbefore mentioned is formed as a helix on the front half of the superheating chamber, and from the inner end of its helical portion the coil extends to the rear end of the chamber with which it communicates to discharge the kerosene vapor thereto for superheating. The superheating chamber is closed at its ends with heads 58 and the rear head is provided with an angular extension 59, having a passage 60 therethrough leading to the interior of the chamber and with which the rear end of the vaporizing coil connects. The connection between the extension and vaporizing coil is made by means of a differential nut 61 and access to the connection is had through a hand hole 62 in the wall of the heater, which is closed by a cover plate 63, Fig. 5. At the inner end of the passage 60 a spraying nozzle 64 is secured, and a needle or spindle 65 is provided whereby the quantity of vapor discharging into the superheating chamber may be regulated when desired. The spindle is mounted in the rear head of the heater and on its outer end carries a hand wheel 66, by manipulation of which the pointed end of the spindle is caused to vary the opening of the passage 60. The nozzle serves to spray the vapor upon the heated surface of the superheated chamber so as to effectually and rapidly raise the temperature of the vapor.

The front end of the vaporizing coil is suitably coupled through the wall of the superheating chamber with a liquid fuel supply pipe 67. The fuel supply system comprises a fuel tank 68 for kerosene, a force pump and the supply pipe 69. The effective discharge of the pump may be varied by adjusting the stroke of the piston in an obvious manner, so that the quantity of fuel supplied to the vaporizer may be suitably proportioned to the vaporizing capacity determined upon for normal operation of the vaporizer. As the vaporizer is of the flasher type, the supply of fuel must bear a definite relation to its flashing capacity so as not to exceed that limit, otherwise there would result a flushing of the vaporizer with liquid fuel. By reason of the large effective heating area of the superheating chamber, and the temperature to which it is subjected, the vapor which discharges into the same from the vaporizing or flashing coil becomes superheated and raised to the desired pressure. The vapor fuel in the superheating chamber is unmixed with air and is therefore non-explosive and the fuel charges depend upon subsequent mixing with air in the explosion chamber to be rendered explosive.

Between the superheating chamber and vapor fuel supply pipes 44, communication is established through passages 70 in the upper webs 57, between the wall of the heater and superheating chamber, Figs. 4 and 5, and the vapor fuel is supplied to the explosion chamber as the by-pass valves 28 are opened. The vapor pressure in the vaporizer must be sufficiently high so that in addition to the pressure of the by-passed air charge, the combined pressures will exceed the pressure that will have been attained in the explosion chambers while the pistons work on the compression stroke the distance between the exhaust ports and full-admission ports, which may be termed the initial stage of compression. At normal operation the pressure best adapted to this condition is approximately 10 pounds per square inch. In each vapor fuel supply pipe 44 a shut-off valve 71 is provided whereby any one or more explosive chambers may be cut out of service by shutting off the supply of vapor fuel thereto.

The vaporizer is adapted to generate vapor in such quantity as to amply supply the maximum demand that is likely to be made at overload of the engine, whereas at normal load this quantity is in excess of the demand so that there exists a surplus of vapor under these conditions. As the generation of vapor is practically at a constant rate, this surplus would tend to store up in the vaporizer and raise the pressure therein. For this purpose the vaporizer is provided with a by-pass leading to the source of fuel and the excess of fuel is returned to the latter. This is controlled by a relief valve which is sensitive to pressure variation in the vaporizer, and according to any changes in the pressure the valve responds thereto, either closing or opening the by-pass as the case may demand, thus acting as a throttle in the by-pass. To this extent the by-pass valve is automatic in its regulation by vapor-pressure influences. At certain times, however, this is not sufficiently responsive to effect close regulation of the engine, as would be required in special cases of work, as in electric lighting systems. There exists an appreciable lag in the action of the relief valve to follow the variation of the engine speed, as the vapor pressure does not change quickly enough. To overcome this the valve must be positively actuated, quick to respond to every perceptible change of the engine speed. Thus, for instance, an overload on the engine tends to decrease the speed, the governor is immediately thrown into operation, prolonging the cut-off to admit larger fuel charges and simultaneously the governor is adapted to actuate the relief valve, immediately closing the same to prevent all or a portion of the excess of the vapor to by-pass, and utilizing this vapor to supply the extra demand of the engine. And, conversely, at underload the governor operates simultaneously the cut-off mechanism to reduce the quantity of vapor supplied for each charge, and the relief valve to cause it to open wider to permit a larger escape of the vapor from the vaporizer, thereby lowering the pressure in the latter. Accordingly, it will be noted that normally the pressure of the vapor is substantially constant, and under variation in load the pressure changes to meet these new conditions.

Figure 1:
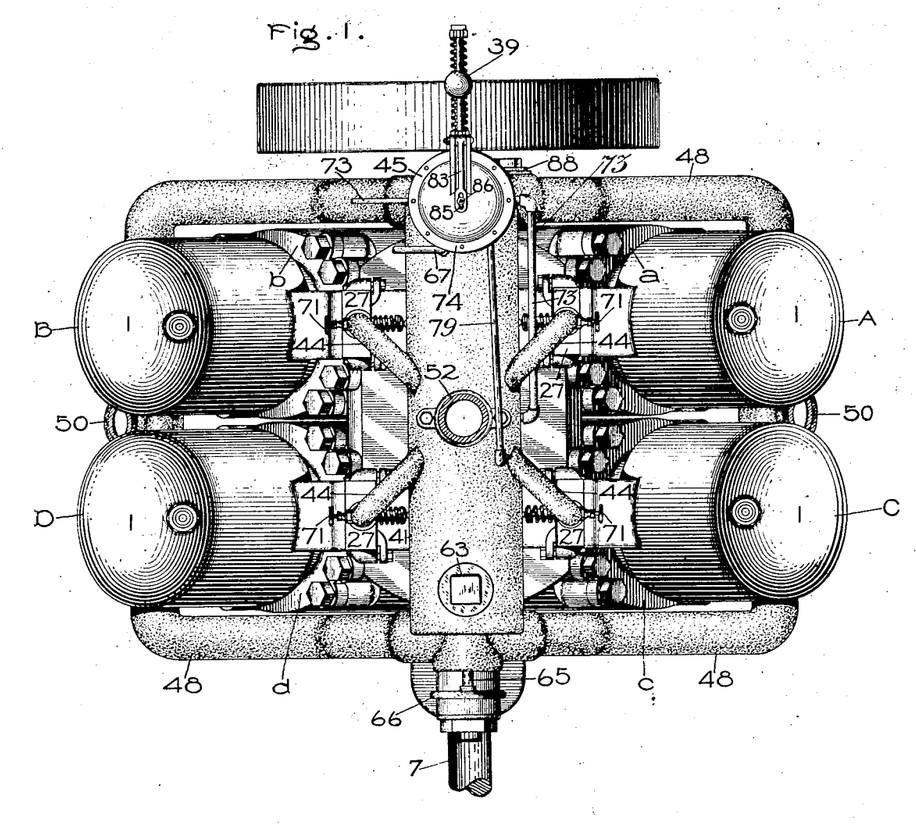
Figure 1 is a top plan view of my improved two-cycle kerosene vapor engine of the four-cylinder type.

The following is a description of the mechanism for accomplishing the above method of regulation. The relief device 45 comprises a pressure-actuated valve situated in a by-pass connection or pipe 73 connected with a passage 78 in the lower web 57 at the bottom of the superheating chamber and with the fuel tank 68, Figs. 4 and 5. The relief valve embodies a pressure chamber 74, a diaphragm 75, a stem or needle 76 carried thereby, and an adjustable spring 77 impinging upon the upper side of the diaphragm, Fig. 5. The lower part of the pressure chamber communicates with the interior of the superheating chamber through the passage 70 of one of the upper webs 57 and a pipe connection 79, Figs. 1, 2 and 4. The diaphragm is thus subjected to the vapor tension of the superheating chamber, and the adjustable spring 77 is so set that the valve stem or needle 76 is balanced suitably above the seat to permit a definite excess of vapor to discharge through the by-pass. Should the pressure of the vapor tend to vary for any reason the valve will act automatically to correct the variation and maintain the pressure constant. The vapor that is relieved through the relief valve passes through a condenser 80 which is arranged in circuit with the by-pass connection 73, shown diagrammatically in Fig. 4, so as to deliver the excess kerosene vapor in liquid state to the fuel tank.

For the positive actuation of the relief valve connection between the governor and the valve spring is provided so that tension of the spring varies according to the action of the governor. Bearing upon the spring 77 which impinges upon the diaphragm is a follower 81, suitably guided in the pressure chamber, Fig. 5, and connected with the follower is a rod 82 which projects through the wall of the chamber to afford connection with the intermediate means attached to the governor. This means comprises hinged levers 83 and 84 fulcrumed on the engine at suitable points or respectively on the pressure chamber and heater of the vaporizer, as shown. The upper end of lever 83 is formed with an eye 85, through which passes the rod 82 and held therein by means of adjustable nuts 86 on the rod which engage with the eye. This construction permits of the desired tension to be set on the spring by adjusting the nuts. The lower lever is bifurcated at its lower end and the extremities thereof engage in an annular groove 87 in the sliding collar 40 of the governor. By this arrangement any variation in the engine speed to which the governor responds is caused to be transmitted to the follower through the levers, and the follower in turn acts upon the spring to the end that greater or less tension is placed upon the diaphragm and the relief valve is correspondingly regulated.

Figure 3:
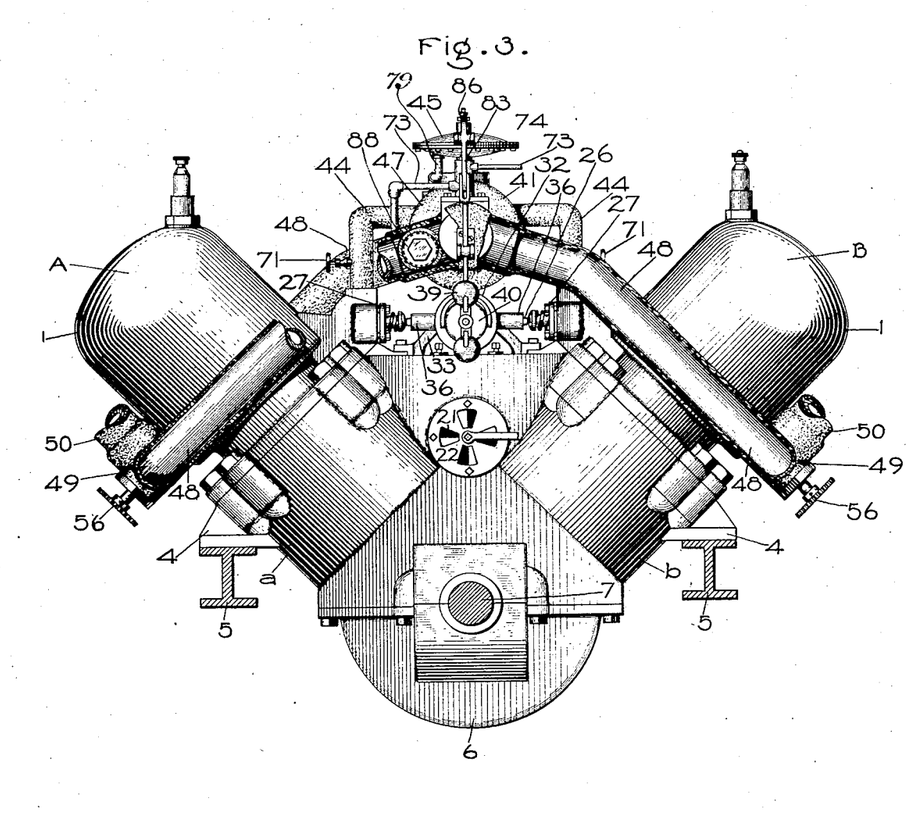
Fig. 3 is a front elevation with a part of one exhaust pipe broken away.

In order to start the engine either of two methods may be employed. The first of these depends upon the vaporizer, that is the vaporizing coil and superheating chamber, being heated as by a torch to the proper temperature preparatory to supplying kerosene thereto and before the engine is started. In this manner the engine is in condition to start on kerosene vapor. In the second method the engine is started independently of the kerosene vaporizer, as the vapor mixture is derived from a different source. An auxiliary gasolene vaporizer or carbureter is employed to supply the explosive mixture to the engine during this starting period and the exhaust gases of the explosion serve to heat the kerosene vaporizer of the engine so that a torch is not needed. After this preliminary heating to the proper temperature, kerosene is supplied to the vaporizer and the vapor thus generated is used for the explosive charges instead of the gasolene mixture which is at this stage cut off. To adapt the engine to these methods of starting the vapor generation, according to the first, one of the exhaust pipes 48 is provided with an opening adjacent to the front end of the heater through which the flame of a starting torch may be introduced to impinge upon the vaporizing coil and superheating chamber. As shown in Figs. 2 and 3, a removable cover 88 is adapted to be secured over this opening and prevents the escape of exhaust gases therefrom after starting. In carrying out the second method, connection may be provided with a gasolene supply and carbureting system (not shown) which supplies the explosive mixture to the air-suction chamber 20 of the engine through the suction pipe 89, Fig. 5. According to this method the air system for the scavenging operation is for the time interrupted as the suction of mixture takes the place of the air supply. Under these conditions, the engine operates practically on the ordinary two-cycle principle, as to scavenging with the explosive charges. After the kerosene vaporizer has been sufficiently heated by the exhaust gases and vapor generation commenced, the gasolene mixture is cut off and the air system thus becomes restored and the engine takes up its cycle according to the principle herein described.

I do not claim in this application the vapor generating apparatus nor the speed controlling system used therewith as such constitute the subject-matter of a divisional application, Serial No: 212,230, filed June 13th, 1904.

In accordance with the provisions of the patent statutes, I have described the principle of operation of my invention together with the apparatus which I now consider to be the best embodiment thereof; but I desire to have it understood that the apparatus is only illustrative and that the invention can be carried out by other means.

What I claim as new and desire to secure by Letters Patent of the United States, is,

1. In an explosive engine, the combination with an explosion cylinder provided with exhaust and admission ports, and a power piston in the cylinder covering and uncovering said ports, of means for injecting a scavenging charge at substantially atmospheric pressure into the cylinder, through certain of the admission ports and means for injecting a charge of fuel into the cylinder through other admission ports substantially in continuity with the scavenging charge and at a definite point in the compression stroke of the piston after closure of the exhaust ports.

2. In an explosive engine, the combination with an explosion cylinder having exhaust and admission ports in its walls, and a working piston in the cylinder controlling said ports, of means for injecting air at substantially atmospheric pressure through certain of the admission ports into the cylinder to scavenge the same, and means for injecting a charge of vaporized and superheated fuel through the other admission ports into the cylinder subsequently to the closure of the exhaust ports.

3. In an explosive engine, the combination with a cylinder provided with exhaust ports, air-admission ports and fuel-admission ports, and a power piston controlling said ports, of an air pump, means connecting the pump with the admission ports for delivering successively a part of the charge of air to the cylinder through the air-admission ports and the remaining part of the charge through the fuel-admission ports, and means for injecting fuel into the air delivering through the fuel-admission ports.

4. In an explosive engine, the combination with a cylinder provided with exhaust ports and two sets of admission ports for air and fuel, and a power piston working in the cylinder and adapted to cover and uncover said ports, of an air pump, conduits connected with the two sets of admission ports which are supplied from the pump, means controlling the flow through one of the conduits whereby the charge of the pump is delivered successively through the air admission ports for scavenging the cylinder and the fuel admission ports for carrying the fuel charge into the cylinder, and means for delivering fuel to the carrying charge.

5. In an explosive engine, the combination with a cylinder provided with exhaust ports, air-admission ports and fuel-admission ports, and a working piston controlling said ports, of an air pump, a branched air-carrying conduit extending from the pump to the separate air- and fuel-admission ports, and means for injecting fuel into the branch of the conduit leading to the fuel-admission ports.

6. In an explosion engine, the combination with a cylinder having exhaust ports, air admission and fuel-admission ports, and a piston controlling said ports, of an air pump, an air-carrying conduit extending from the pump to the air-admission ports, a controlled by-pass between the conduit and fuel-admission ports for permitting air to discharge therethrough subsequently to the closure of the air-admission ports, and means for injecting fuel into the by-pass.

7. In an explosion engine, the combination with a cylinder having exhaust ports, air-admission ports and fuel-admission ports, and a piston working in the cylinder and adapted to cover and uncover said ports, of an air pump, an air-carrying conduit connecting the pump with the air-admission ports, a by-pass between the conduit and fuel-admission ports, a valve in the by-pass controlling the delivery of the air therethrough, and means for injecting fuel into the by-pass during the delivery of air through the latter.

8. In an explosion engine, the combination with a cylinder having exhaust ports, air-admission ports and fuel-admission ports, and a piston working in the cylinder and adapted to cover and uncover said ports, of an air pump, an air-carrying conduit communicating between the air chamber of the pump and air-admission ports, a by-pass extending from the conduit to the fuel-admission ports, a valve in the by-pass controlling the admission of fuel into the latter and the delivery of air therethrough, and means opening said valve during a definite stage in the compression stroke of the piston in respect to the relative position of the latter to the admission ports.

9. In an explosion engine, the combination with a cylinder having exhaust ports, air-admission ports and fuel-admission ports, and a piston operating to cover and uncover said ports, of a source of air, an air-carrying passage extending from the air source to the air-admission ports, a by-pass connecting the air-carrying passage with the fuel-admission ports, a valve in the by-pass permitting fuel and air to pass simultaneously through the by-pass to the cylinder, and means for actuating the valve periodically and capable of variable action as to the lift of the valve.

10. In an explosion engine, the combination with a cylinder having exhaust ports, air-admission ports, and fuel-admission ports, and a piston operating to cover and uncover said ports, of an air-pump, an air-carrying conduit connecting the pump with the air-admission ports, a by-pass extending from the conduit to the fuel-admission ports, a valve in the by-pass controlling the admission of fuel to the same and the discharge of air therethrough, and an automatic variable cut-off mechanism operating the valve.

11. In an explosive engine, the combination with a cylinder provided with exhaust ports, air-admission ports and fuel-admission ports, a piston controlling said ports, a crank-shaft and piston connection therewith, of an air pump operatively connected with the crank-shaft and adapted to deliver differentially its charge to the cylinder for scavenging the same and for injecting with the fuel charge, a conduit extending from the air pump and communicating with the cylinder through the air-admission ports, means for by-passing a portion of the air charge through the fuel-admission ports, and means for injecting fuel in the by-passing means.

12. In an explosion engine, the combination with a cylinder provided with exhaust ports, air-admission ports and fuel-admission ports, a piston controlling said ports, a crank-shaft and piston connection therewith, of an air pump operatively connected with the crank-shaft and adapted to transfer its charge to the cylinder, an air-carrying conduit connecting the air pump and cylinder, a by-pass between the conduit and fuel-admission ports, means permitting the passage of air therethrough upon or substantially in immediate succession to the closure of the air-admission ports, and means injecting a charge of fuel into the by-pass simultaneously with the passage of air through the same.

13. In an explosive engine, the combination with a cylinder provided with exhaust ports, air-admission ports and fuel-admission ports, a piston covering and uncovering said ports, a crank-shaft and piston connection therewith, of an air pump operated by the crank-shaft and adapted to deliver its charge during the uncovering of the ports at a minimum of back pressure, an air-carrying conduit supplying air to the cylinder from the pump, a controlled by-pass permitting periodical communication between the conduit and cylinder whereby air passes from the former to the latter within the intervals between the uncovering and covering of the ports by the piston, and means for injecting fuel into the by-pass upon said communication being established.

14. In an explosive engine, the combination with a cylinder provided with exhaust ports, air-admission ports and fuel-admission ports, a power piston adapted to cover and uncover said ports, a crank and piston connection therewith, of an air pump directly connected with the crank-shaft which furnishes sufficient air to scavenge the cylinder, and means for transferring the charge of the pump to the cylinder during the period between the uncovering and covering of the said ports so that the pump delivers at substantially atmospheric pressure.

15. In an explosive engine, the combination with a cylinder provided with exhaust ports, air-admission ports and fuel-admission ports, a power piston adapted to cover and uncover said ports, a crank and piston connection therewith, of an air pump directly connected with the crank, a connection through which the charge of the pump is delivered to the cylinder during the period between the uncovering and covering of said ports and at substantially constant atmospheric pressure, and means for by-passing a portion of the air charge from the pump into the cylinder through the fuel admission ports and also for injecting fuel into the cylinder in conjunction with the by-passed portion of the air.

16. In an explosive engine, the combination with a cylinder provided with exhaust ports, air-admission ports and fuel-admission ports, a piston in the cylinder adapted to uncover said ports during the relatively slow speed of the piston while passing through its forward dead center, and a crank shaft connected with the piston, of a reciprocating air pump connected with the crankshaft and having its discharge stroke coincident with the period of uncovering and covering of said ports, means connecting the pump and cylinder through the air admission ports for the transfer of air at substantially uniform atmospheric pressure from the former to the latter for scavenging, and means for injecting a fuel charge into the cylinder through the fuel admission ports subsequent to the closure of the exhaust ports.

17. In an explosive engine, the combination with a plurality of explosion cylinders each having exhaust ports, air- and fuel-admission ports, and power pistons in the cylinders controlling the ports to uncover and cover substantially at or about the forward dead center of the pistons, of a plurality of pump cylinders for air, pistons therefor, air-carrying conduits each coupling a pump cylinder with an explosive cylinder, a crankshaft, piston connections therewith whereby the pump pistons operate to transfer their air charges at substantially atmospheric pressure to the cylinders during the period between the uncovering and covering of the exhaust and admission ports by the power pistons, and means for injecting fuel into the explosion cylinders.

18. In an explosive engine, the combination with a plurality of explosion cylinders each having exhaust ports, air-admission ports and fuel-admission ports, and power pistons in the cylinders controlling the ports to uncover and cover substantially at or about the dead center of the power stroke, of a plurality of pump cylinders for air, pistons therefor, air-carrying conduits each coupling a pump cylinder with an explosion cylinder, an air-suction chamber common to all the pump cylinders and means controlling communication between the same whereby the pump pistons operate to transfer substantially their full charges of air to the explosion cylinders during the period between the uncovering and covering of the admission ports, and means for admitting fuel to the explosion cylinders.

19. In an explosive engine, the combination with a plurality of explosion cylinders, each having exhaust ports, air-admission ports, fuel-admission ports, and power pistons in the cylinders controlling the ports to cover and uncover the same, of a plurality of pump cylinders for air, pistons therefor, air-carrying conduits each connecting a pump cylinder with an explosive cylinder for the suction of air to the former and the delivery thereof to the latter cylinder, an air-suction chamber common to all the pump cylinders through the air-carrying conduits, automatic means controlling the suction of air therefrom through the conduits, a crankshaft, piston connections with the crankshaft whereby the pump pistons operate to transfer their charges of air to the explosion cylinders at the time the admission ports remain open, and means for injecting fuel into the explosion cylinders.

20. In an explosive engine, the combination with a plurality of explosion cylinders each having exhaust ports, air-admission ports and fuel-admission ports, and power pistons in the cylinders controlling the ports to uncover and cover the same, of a plurality of pump cylinders for air, pistons therefor, air-carrying conduits each connecting a pump cylinder with an explosion cylinder for the suction of air into the former and the delivery thereof to the latter cylinder, an air-suction chamber in common communication with the pump cylinders through the air-carrying conduits, automatic means controlling the suction of air from the chamber, means for effecting the delivery of air from the pump cylinder into the explosion cylinder through the air-carrying conduits and admission ports, and means injecting fuel into the explosion cylinder with a portion of the air delivered through the air-carrying conduits.

21. In an explosion engine, the combination with a plurality of explosion cylinders each having exhaust ports, air-admission ports and fuel-admission ports, and power pistons in the cylinders controlling the ports to uncover and cover the same, of a plurality of pump cylinders for air, pistons therefor, air-carrying conduits each connecting a pump cylinder with each explosion cylinder for the suction of air into the former and the delivery thereof to the latter cylinder, an air-suction chamber in common communication with the air-carrying conduits, automatically actuated valves between said conduits and suction chamber, means controlling the intake of air into the suction chamber, means connecting the pump pistons in coöperative relation with the power pistons to effect the transfer of air to the explosion cylinders during the period the power pistons uncover the admission ports, and means for injecting fuel into the cylinders.

22. In an explosive engine, the combination with an explosion cylinder having exhaust ports, air-admission ports and fuel-admission ports, a power piston controlling said ports to uncover and cover the same, of a pump cylinder and piston therefor, an air-carrying conduit connecting the pump cylinder with the explosive cylinder for the suction of air into the former and the discharge thereof into the latter cylinder, an automatically-operated valve controlling the passage of air from the conduit to one set of admission ports, means for varying the quantity of air drawn into the pump cylinder, means connecting the pump piston in coöperative relation with the power piston for permitting the discharge of air to the explosion cylinder during the period the power piston uncovers the admission ports, and means for injecting fuel into the cylinder.

23. In an explosive engine, the combination of a plurality of differential cylinders and pistons forming explosion chambers and air chambers, exhaust ports and admission ports for the explosion chambers controlled by the working pistons, independent air-carrying conduits each connecting a pump chamber of one cylinder with the admission ports of the explosion chamber of another of said cylinders, a crank-shaft, piston connections therewith connecting the pistons in coöperative relation for permitting the transfer of air from the air chambers to the explosion chambers through their respective connecting conduits during the uncovering of the admission ports, and means for injecting fuel into the explosion chamber.

24. In an explosion engine, the combination of a plurality of differential cylinders each providing separate explosion and air chambers, differential pistons in the cylinders, exhaust ports and admission ports for the explosion chambers covered and uncovered by the working pistons, air-carrying conduits each connecting a pump chamber of one cylinder with the admission ports of the explosion chamber of another of said cylinders, means operatively relating the pistons to each other to permit the transfer of air from the air chambers to the explosion chambers through their respective connecting conduits during the uncovering of the admission ports, and means for injecting fuel into the explosion chambers.

25. In an explosive engine, the combination of right angularly disposed differential cylinders each comprising an explosion chamber and an air chamber, exhaust and admission ports in the explosion chambers, air-carrying conduits each extending between the air chamber of one cylinder and the explosion chamber of another cylinder for admitting air to the former chamber and also delivering it from said air chamber to the explosion chamber, pistons working in the chambers and adapted to cover and uncover said ports, a crank-shaft, means connecting the pistons with the crank-shaft in coöperative relation to permit the transfer of air from the air chambers to the explosion chambers through said air-carrying conduits during the uncovering of the admission ports, and means for injecting fuel into the explosion chamber.

26. In a two-cycle explosive engine, the combination of right angularly disposed differential cylinders arranged in pairs side by side in parallel planes, differential pistons each coöperating with its respective cylinders to provide an explosion chamber and an air chamber, exhaust ports and separate air- and fuel-admission ports communicating with said explosion chambers and controlled by the pistons which cover and uncover the same, air-carrying conduits each extending between the air-admission ports of the explosion chamber of one cylinder and the air chamber of another cylinder, a by-pass between the fuel-admission ports of each cylinder and the air-carrying conduit leading to the latter, means in each by-pass for controlling the transfer of air therethrough and for injecting fuel with the air, a crank-shaft having crank-pins diametrically disposed and equal in number to the pairs of pistons, and piston rods connecting each pair of pistons with a single crank-pin.

27. In an explosive engine, the combination of right angularly disposed explosion cylinders arranged in pairs in parallel planes, admission ports and passages in the explosion cylinders, pump cylinders alining with the explosion cylinders, a suction chamber, said pump cylinders and suction chamber comprising an integral casting, conduits formed in the top of the suction chamber to provide communication between the pump cylinders and suction chamber and between the pump cylinders and explosion cylinders through the admission ports and passages, automatic valves controlling the communication between the suction chamber and pump cylinders, means controlling the intake of air into the suction chamber, and pistons operating in the cylinders.

28. In an explosive engine, the combination of a plurality of explosive cylinders, air-pump cylinders alining therewith and different in diameter from the explosion cylinders, an air-suction chamber, said pump cylinders and suction chamber comprising an integral casting, air-carrying conduits provided in said casting and affording communication between the pump cylinders and explosive cylinders, automatically-actuated valves between the suction chamber and conduits, an adjustable valve controlling the inlet of air into the suction chamber, and differential pistons operating in said cylinders.

29. In an explosion engine, the combination of a plurality of explosion cylinders, air-pump cylinders alining therewith, an air-suction chamber common to all the pump cylinders, said pump cylinders and chamber comprising an integral casting, conduits formed in the casting to provide communication between the air-pump cylinders and suction chamber and between the air-pump cylinders and explosion cylinders, and pistons operating in the cylinders.

30. In a two-cycle explosive engine, the combination of an explosion cylinder having a closed head and exhaust ports at the open forward end thereof, a single piston therein controlling by its movements the exhaust ports, air-admission ports separate from said exhaust ports and also controlled by the piston to admit a charge of scavenging air into the cylinder at substantially atmospheric pressure during a portion of the time the exhaust ports remain open, and fuel-admission ports for admitting fuel into the cylinder in successive order to the admission of the air charge and subsequently to the closure of the exhaust ports.

31. In a two-cycle explosive engine, the combination of an explosion cylinder having a closed head and exhaust ports at the open forward end thereof, a power piston therein controlling by its movement the exhaust ports, a conduit opening into the cylinder adjacent the exhaust ports and also controlled by the piston which discharges towards the cylinder head for injecting a charge of scavenging air after the exhaust ports open, and a valved conduit leading to an opening adjacent the forward end of the cylinder for injecting a charge of vapor fuel into the same subsequently to the closure of the exhaust and directing the course of the fuel charge toward the closed head for agitating and mixing with the air charge in the cylinder.

32. In a two-cycle explosive engine, the combination of an explosion cylinder having exhaust ports at the forward end thereof, a power piston controlling said ports, means at the exhaust end of the cylinder for injecting into the cylinder charges of scavenging air at substantially atmospheric pressure, and means for injecting charges of vapor fuel at a relatively higher pressure after the exhaust ports have been closed.

33. In a two-cycle explosive engine, the combination with a shaft, a power cylinder and piston, of means driven by the engine shaft which receives air for scavenging at atmospheric pressure and introduces it directly into the cylinder without compressing it, and means for injecting a charge of vapor fuel under pressure into the cylinder subsequent to scavenging and during that portion of the compression stroke of the piston following the closing of the exhaust ports.

34. In a two-cycle explosive engine, the combination with a shaft, a power cylinder and piston, of means driven from the engine shaft which receives air for scavenging at atmospheric pressure and introduces it directly into the cylinder without compressing it, and means for introducing a charge of vapor fuel under pressure into the cylinder after the closure of the exhaust ports.

35. In an explosive engine, the combination of a cylinder having exhaust ports and separate fuel and air ports at its forward end, a piston in the cylinder which moves over said ports to open and close them, means for supplying air to the air ports while the exhaust ports are open and also for supplying air for the fuel charge, and a carbureting device receiving air from said supplying means and delivering its fuel charge to the fuel ports after the exhaust ports are closed.

36. In an explosive engine, the combination with a cylinder provided with exhaust ports, air admission ports, fuel admission ports, and a power piston controlling said ports, of a carbureting device, an air pump, means connecting the pump with the air admission ports and said device for delivering a part of its charge of air to the air ports and then the remaining part of the charge to the carbureting device, and a connection from said device to the fuel ports.

In witness whereof I have hereunto set my hand this second day of November, 1903.

HENRY O. WESTENDARP.

Witnesses:
DUGALD McK. McKILLOP,
JOHN A. McMANUS.